Patented June 6, 1950

2,510,925

UNITED STATES PATENT OFFICE 2,510,925

2-SULFANILAMIDO-5-CARBAMYLTHIAZOLE AND ITS PRODUCTION

Herman Eldridge Faith, New Palestine, Ind., assignor to Allied Laboratories, Inc., Kansas City, Mo., a corporation of Delaware No Drawing. Application March 20, 1948, Serial No. 16,137

2 Claims. (Cl. 260—239.6)

The present invention relates to the new chemical compound 2-sulfanilamido-5-carbamylthiazole and a method for its production.

In accordance with the present invention, 2-amino-5-carbamylthiazole is reacted with p-nitrobenzenesulfonylchloride and the nitro group on the reaction product reduced to an amino group to give 2-sulfanilamido-5-carbamylthiazole. The first step in the above reaction is preferably carried out in dry pyridine. It is contemplated that the reaction could be carried out in a reaction medium employing other organic liquids. Similarly the reaction may be carried out in a suitable medium in the presence of an excess of sodium hydroxide or other alkali hydroxide. The p-nitro group is readily converted to an amino group by a reduction step employing iron dust. It is to be understood, however, that other reduction methods may be applicable.

My new compound possesses properties which may render it useful in the treatment of infectious diseases of the intestinal tract since the compound is only very sparingly absorbed when administered orally. The compound is likewise useful as an intermediate for the production of other pharmaceuticals and dyestuffs.

The invention will be described in greater detail in conjunction with the following specific example which, however, is merely illustrative of the preferred method and is not intended to limit the scope of the invention. The parts are by weight except in the case of liquids which are expressed in corresponding parts by volume.

EXAMPLE

*Preparation of 2-amino-5-carbamylthiazole*

250 parts of 2-amino-5-carbomethoxythiazole are stirred at 50° C. for 10 hours in 2500 parts of concentrated ammonium hydroxide. The mixture is cooled and filtered. The filtrate is concentrated by vacuum distillation. The residual material is dissolved in hot water, filtered and cooled to give 2-amino-5-carbamylthiazole.

*Preparation of 2-(p-nitrobenzenesulfonamido)-5-carbamylthiazole*

122 parts of 2-amino-5-carbamylthiazole are suspended in 400 cc. of dry pyridine. To this suspension is added 216 parts of p-nitrobenzenesulfonyl chloride over a 90-minute period. After the addition, the temperature is maintained at 60° C. for 2 hours. Next, the mixture is diluted to 2 or 3 times its volume with water, and the precipitated compound is filtered off. It is dissolved in dilute sodium hydroxide solution, stirred with charcoal, filtered and reprecipitated by acidifying with hydrochloric acid. The product is 2-(p-nitrobenzenesulfonamido)-5-carbamylthiazole.

*Preparation of 2-sulfanilamido-5-carbamylthiazole*

To a stirred suspension of 90 parts of iron dust in 350 parts of 5% acetic acid are added 86 parts of 2-(p-nitrobenzenesulfonamido)-5-carbamylthiazole. The temperature is kept below 50° C. during the addition and afterwards the mixture is heated by steam for 1.5 hours. The mixture is then cooled and made alkaline with sodium hydroxide solution. The insoluble material is filtered off and the filtrate is acidified to pH 5 or 6. 2-sulfanilamido-5-carbamylthiazole precipitates. Additional sodium hydroxide extractions of the iron dust yield more product.

What I claim is:

1. The process which comprises reacting 2-amino-5-carbamylthiazole with p-nitrobenzenesulfonyl chloride and reducing the nitro group on the reaction product to an amino group to produce 2-sulfanilamido-5-carbamylthiazole.

2. The compound 2-sulfanilamido-5-carbamylthiazole.

HERMAN ELDRIDGE FAITH.

REFERENCES CITED

The following references are of record in the file of this patent:

FOREIGN PATENTS

| Number | Country | Date |
|---|---|---|
| 517,272 | Great Britain | Jan. 25, 1940 |

OTHER REFERENCES

Ellingson et al.: J. Am. Chem. Soc., vol. 67, pp. 1711–1713 (1945).

Winnek: Science, vol. 103, pp. 719–720 (1946).

Bernstein et al.: J. Am. Chem. Soc., vol. 69, pp. 1158–1160 (May 1947).